United States Patent [19]

Belsky et al.

[11] 4,366,951
[45] Jan. 4, 1983

[54] APPARATUS FOR REFINING METAL MELTS FROM INSULUBLE IMPURITIES

[76] Inventors: Valentin I. Belsky, ulitsa Petukhova, 68, kv. 61; Gennady I. Orlov, ulitsa Vatutina, 27, kv. 20; Serafim N. Suturin, ulitsa Kozhevnikova, 2, kv. 22; Anatoly V. Dolgov, Morskoi prospekt, 36, kv. 30; Vladimir I. Antonov, ulitsa Petukhova, 26, kv. 47; Jury A. Naryshkin, ulitsa Bljukhera, 7, kv. 55, all of Novosibirsk, U.S.S.R.

[21] Appl. No.: 348,984

[22] Filed: Feb. 16, 1982

[51] Int. Cl.³ .............................................. B01D 35/02
[52] U.S. Cl. ....................................... 266/204; 75/63; 210/370; 266/227
[58] Field of Search .................... 75/63; 266/204, 227; 210/370; 233/2

[56] References Cited

U.S. PATENT DOCUMENTS 3,780,864  12/1973  Dolgov et al. ........................ 210/370

*Primary Examiner*—M. J. Andrews
*Attorney, Agent, or Firm*—Steinberg & Raskin

[57] ABSTRACT

The apparatus comprises a housing, a filtering device, mechanisms for driving the filtering device, respectively, through rotation and reciprocation and a device for discharging impurities from the filtering device. The filtering device includes the top and bottom plates spaced from one another, the top plate being mounted on a hollow stem, and the bottom plate being mounted on another stem extending through the hollow one. In accordance with the invention, to adjust the spacing of the plates, the filtering device includes a resilient member supported by the stem extending through the hollow one and adapted to cooperate with the hollow stem so as to maintain the relative position of the plates. The end of the same stem extending through the hollow stem, remote from the bottom plate, carries a first abutment cooperating with the resilient member. The end of the hollow stem carries an adjustable abutment adjoining the first abutment, the relative position of the adjustable abutment and the first abutment defining the desired spacing of the plates.

The present invention can be utilized to utmost effectiveness for refining tin, lead and their alloys.

4 Claims, 5 Drawing Figures

APPARATUS FOR REFINING METAL MELTS FROM INSULUBLE IMPURITIES

The invention relates to non-ferrous metallurgy, and more particularly, it relates to an apparatus for refining metal melts from insoluble impurities.

The invention can be utilized to utmost effectiveness for refining tin, lead and their alloys.

One of the most broadly used techniques of refining tin, lead and their alloys is fire refining based on crystalline compounds of the impurities being formed at a certain temperature, which compounds are insoluble in the melt. These compounds are removed off the surface of the molten metal either as solids or as a foam or skim, the removal being performed either manually or with the use of primitive mechanisms. This practice is characterized by considerable amounts of the metal being removed with the impurities, which complicates further treatment of the latter and steps up the loss of the metal being refined.

The most efficient technique of separating the liquid and solid phases of a melt is its centrifugal filtration.

There is broadly known an apparatus for centrifugal filtration of molten metals, comprising a housing having mounted thereon a filtering device and a drive for rotating the latter. The filtering device includes a drum with slits made through its periphery. The apparatus operates, as follows. The apparatus is positioned adjacent to the pot with molten unrefined metal. A special device is used to pour the unrefined melt into the rotating filtering device, so that the metal is filtered out through the slits in the periphery of the filtering device. The filtered-out metal flows down the metal collector into a specifically provided vessel, while the insoluble impurities are retained by the filtering device.

However, in operation of this appparatus the stream of the metal melt enters the rotating filtering device together with a certain amount of ambient air, which results in oxidation of the metal and steps up the loss of the metal being refined. Besides, in this known apparatus of the prior art, it is quite difficult to maintain the required temperature of the housing of the filtering device. Furthermore, the apparatus requires for its operation the specific device for pouring the metal melt into the filtering device.

The employment of submerged-type apparatus for centrifugal refining of metal melts has proved to be more efficient in the field of refining metal melts from insoluble impurities.

There is known a submersible apparatus for centrifugal refining of metal melts from insoluble impurities (cf. USSR Inventor's Certificate No. 463,334).

The apparatus has a housing. The bottom part of this housing has in its periphery a plurality of openings for unloading or discharging the impurities. The apparatus further includes a filtering device comprising a top plate with ports made therethrough, mounted on a hollow stem, and a bottom plate mounted on another stem extending through the hollow one. The said plates are arranged for their bases to face each other, with a gap left therebetween.

The filtering device is provided with a locking member for retaining the plates in a required relative position.

The apparatus further includes a mechanism for reciprocating the filtering device and a mechanism for rotating this device.

The apparatus operates, as follows.

The apparatus is mounted directly onto the refining pot containing the metal melt. The plates of the filtering device are submerged into the metal melt by the mechanism for reciprocating the filtering device. The mechanism for rotating the filtering device is operated to rotate the latter at a required angular speed. The metal melt flows from the refining pot into the space between the top and bottom plates through the ports provided in the top plate. Once in the space between the plates, the molten metal is driven by the centrifugal forces through the gap between the bases of the plates, back into the refining pot, while the impurities are retained in the space between the plates as insoluble crystalline residue. With the impurities having filled up the space between the plates, the filtering device is lifted off the pot by the reciprocation mechanism. The locking member whose position defines the gap between the bases of the top and bottom plates is removed, the spacing of the plates is significantly enlarged, and the impurities are thrown by centrifugal forces into the housing of the apparatus. Once thrown into the housing of the apparatus, the impurities fall out by gravity through the openings in the bottom part of the housing, adjacent to the periphery thereof, into a space outside the refining pot. With the impurities discharged from the filtering device, the gap between the bases of the plates is reduced to the initial operating value, the locking member is reinstalled to retain the desired relative position of the plates, the latter are submerged into the melt, and the above cycle is repeated. The refining cycles are performed successively with the melt temperature gradually lowered, until the required degree of purification of the metal is attained.

As the metal is being refined in the last-described apparatus, the plates of the filtering device are submerged in the melt being refined, whereby the necessity of specifically heating the filtering device and maintaining its temperature within a preset range is eliminated.

Moreover, it is no longer necessary to have a specific device for pouring the metal to be refined into the filtering device, as the metal fills the space between the plates in a gravity flow. Oxidation losses of the metal are reduced, as the splashing of metal leaving the filtering device and its contact with ambient air are precluded.

The most important aspect, though, is that the apparatus provides for conducting the refining process with the melt temperature declining, i.e. as the impurities are withdrawn from the melt, the latter's temperature is continuously lowered to enhance the evolution of the impurities as insoluble compounds, which takes place to the highest degree at a melt temperature just slightly above its crystallization point.

However, the last-described known apparatus is devoid of facilities for controlling the value of the gap between the bases of the plates, both for operation within the melt and for discharging the impurities, which would not provide for optimizing the working duty of the apparatus when refining metals with different impurity content values. Moreover, to discharge the impurities from the filtering device, it is necessary to remove the locking member; furthermore, in order to prepare the plates for subsequent submersion in the melt, the spacing of the plates is to be reduced and retained by reinstalling the said locking member, which complicates the automation of the operation of the apparatus with continuous repetition of the refining cycles.

It is the main object of the present invention to provide an apparatus for refining metal melts from insoluble impurities, having the filtering device of a structure enabling to refine metals within a broad range of impurity content values.

It is a no less important object of the present invention to create an apparatus for refining metal melts from insoluble impurities, which should have the filtering device of a structure enabling to introduce automation of the refining operation.

These and other objects are attained in an apparatus for refining metal melts from insoluble impurities, comprising a housing, a filtering device with a top plate and a bottom plate spaced from one another, the top plate being mounted on a hollow stem and the bottom plate being mounted on another stem extending through the hollow one, mechanisms for driving the filtering device, respectively, through rotation about a longitudinal axis and reciprocation about this axis, and a device for discharging impurities from the filtering device, in which apparatus, to provide for adjusting the spacing of the plates, the filtering device includes a resilient member supported by the stem extending through the hollow stem and adapted to cooperate with the hollow stem so as to maintain the relative position of the plates, the end of the same stem extending through the hollow stem, opposite to the attachment of the bottom plate, carrying the first abutment adapted to cooperate with the resilient member, the end of the hollow stem carrying an adjustable abutment adjoining the first abutment, the relative position of the first abutment and the adjustable abutment defining the required spacing of the plates.

With the filtering device having the resilient member mounted on its stem for cooperation with the hollow stem in order to retain the relative position of the plates, and with the end of the same stem, remote from the attachment of the bottom plate, carrying the abutment cooperating with this resilient member, and with the end of the hollow stem carrying the adjustable abutment adjoining the first-mentioned abutment, so that the relative position of these abutment defines the required spacing of the plates, it has become possible to adjust in a relatively simple manner the gap between the bases of the plates for operation inside the melt, which is essential for optimizing the working duty of the apparatus when refining metals with various impurity content values. Furthermore, there has been provided the possibility of introducing automation into the operation of setting the required value of the gap between the bases of the plates prior to their submersion in the melt after the discharging of the impurities from the filtering device has been completed, which facilitates the task of automatically controlling the operation of the apparatus with continuous repetition of refining cycles.

It is expedient that the device for discharging impurities from the apparatus should include an adjustable stop mounted on the housing directly above the respective end faces of the two stems, remote from the plates, adapted to cooperate operatively with the stem extending through the hollow stem. It is further expedient that the apparatus should include a mechanism for significantly and instantly enlarging the spacing of the plates in course of discharging impurities from the filtering device.

With the apparatus incorporating the device for discharging impurities from the filtering device, including the adjustable stop mounted on the housing directly above the respective ends of the stems, remote from the plates, and the mechanism for significantly and instantly enlarging the spacing of the plates for discharging impurities from the filtering device, it has become possible to adjust the gap between the bases of the plates in a relatively simple manner. Furthermore, it has become possible to control automatically the setting of the gap between the bases of the plates as the filtering device discharges the impurities, and, hence, to control automatically the operation of the apparatus, as a whole, with continuous repetition of refining cycles.

As an outcome of the abovespecified novel structural features, there has been provided the possibility of refining metals within a broad range of impurity content values, and, furthermore, the possibility of automatically controlling the refining process.

For the invention to be better understood, given hereinbelow is a description of an embodiment of the present invention in an apparatus for refining metal melts from insoluble impurities, with reference being made to the accompanying drawings, wherein.

Figure 1:
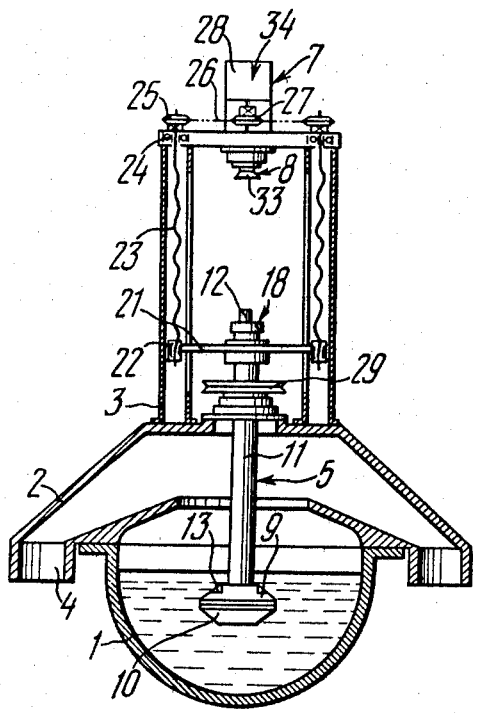
FIG. 1 is a sectional general view of an apparatus for refining metal melts from insoluble impurities, embodying the invention.

Referring now to the appended drawings, the apparatus for refining metal melts from insoluble impurities is adapted to be mounted on a pot 1 (FIG. 1).

Figure 2:
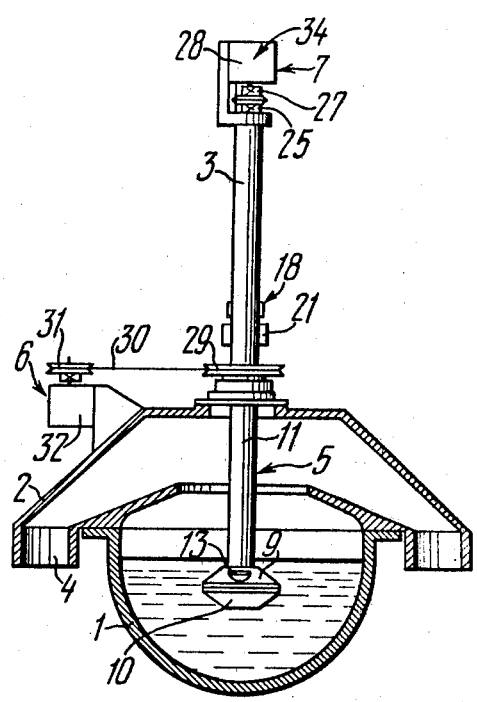
FIG. 2 is a sectional left-hand general view of the apparatus for refining metal melts from insoluble impurities, embodying the invention.

The apparatus for refining metal melts from insoluble impurities comprises a housing 2 with an inverted U-shaped upright 3. The bottom part of the housing 2 has openings 4 made therethrough at the periphery of the housing 2, for unloading impurities from the apparatus. The housing 2 accommodates a filtering device 5. Mounted on the housing 2 are a mechanism 6 (FIG. 2) for actuating the filtering device through rotation about its longitudinal axis, a mechanism 7 for reciprocating the filtering device 5 along this axis and a device 8 (FIG. 1) for discharging impurities from the filtering device 5.

Figure 3:
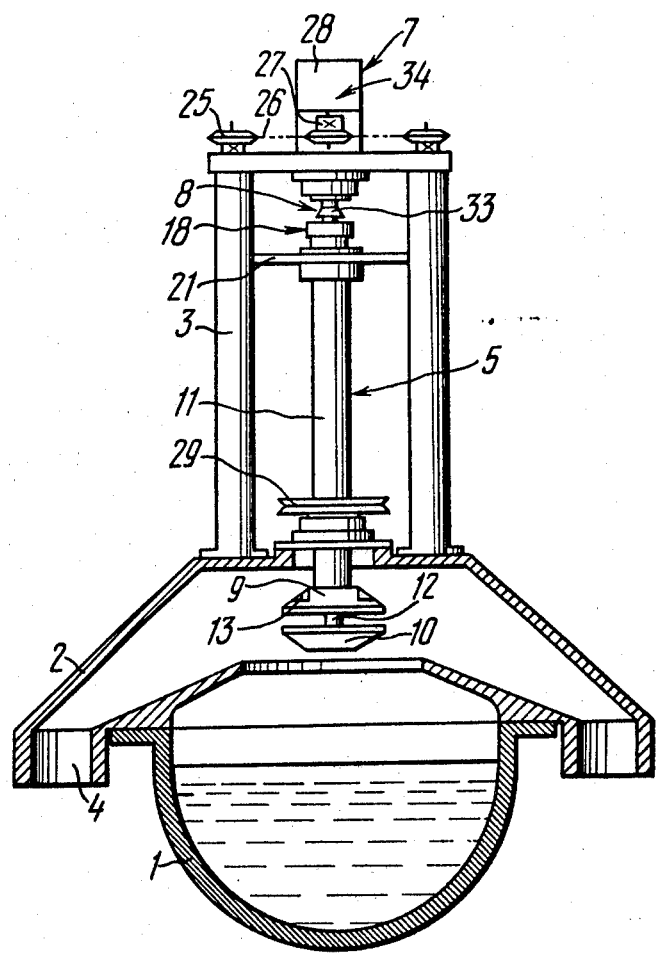
FIG. 3 shows the general view of the apparatus for refining metal melts from insoluble impurities, embodying the invention, with the filtering device in the impurity discharge position.
Figure 4:
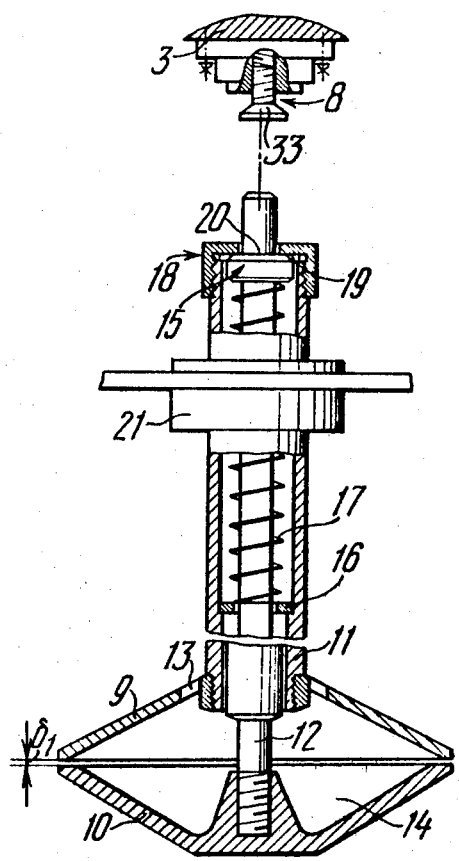
FIG. 4 shows on an enlarged scale a sectional view of the filtering device in accordance with FIG. 1.

The filtering device 5 comprises a top plate 9 (FIG. 3) and a bottom plate 10 mounted, respectively, on a hollow stem 11 and a stem 12 extending through the hollow stem 11. The plates 9 and 10 are set with a gap $\delta_1$ (FIG. 4) between their bases. The top plate 9 has ports 13 made therethrough for access of the melt into the space 14 between the plates 9 and 10. The end of the stem 12, remote from the attachment of the bottom plate 10, has a fixed abutment 15 fastened thereto. The hollow stem 11 has an internal abutment 16 mounted intermediate its ends, and a resilient member 17 is received about the internal stem 12. In the embodiments described, the abutment 16 is in the form of an apertured disc; however, it may be of any other known per se suitable kind. The resilient member 17 in the embodiment described is in the form of a helical compression string; however, it may be of any other known per se suitable kind, too.

The resilient member 17 cooperates with the abutment 15 carried by the stem 12 and with the abutment 16 mounted inside the hollow stem 11, so as to retain the relative position of the plates 9 and 10. The end of the hollow stem 11 carries an adjustable abutment 18 adjoining the abutment 15 carried by the stem 12. In the embodiment described the adjustable abutment 18 is in the form of a nut, but it may be of any other known per se suitable structure. The adjustable abutment 18 has its surface 19 engaging the surface 20 of the abutment 15 carried by the stem 12. By adjusting the abutment 18 longitudinally of the hollow stem 11 there is adjusted the value of the gap between the plates 9 and 10, in order to optimize the operation of the plates 9 and 10 in the melt.

Figure 5:
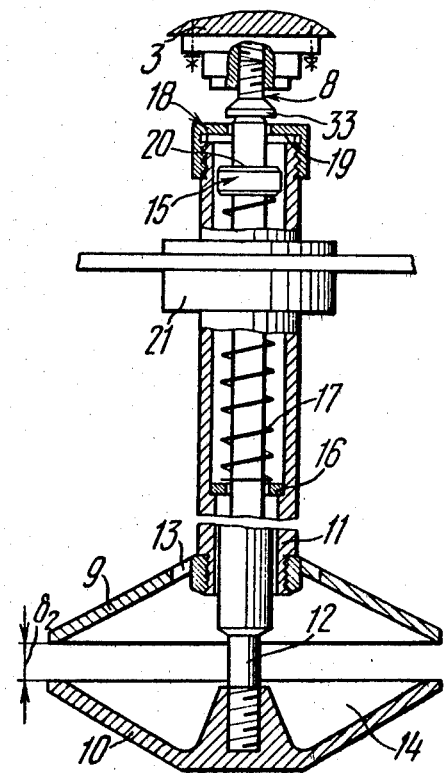
FIG. 5 shows on an enlarged scale a sectional view of the filtering device in accordance with FIG. 3.

The top part of the filtering device 5 (FIG. 1) is rotatably received in the crosspiece 21 of the mechanism 7 for reciprocating the filtering device 5 longitudinally of this device. The crosspiece 21 is suspended with aid of nuts 22 from lead screws 23 journalled in bearings 24 in the inverted U-shaped upright 3. The lead screws 23 carry fixed sprockets 25 engaged by a chain 26 for timed rotation of these lead screws 23. The chain 26 is also engaged by a sprocket 27 of the drive 28 belonging to the reciprocating mechanism 7. Rotatably mounted on the housing 2 is a pulley 29 coaxial with the filtering device 5, belonging to the mechanism 6 for rotating the filtering device 5. The pulley 29 is received about the hollow stem 11 of the filtering device 5 to transmit the driving torque to the filtering device 5 and to permit its longitudinal reciprocation in any suitable known per se manner. The pulley 29 (FIG. 2) is operatively connected by a flexible driving member 30 to the pulley 31 of a drive 32 belonging to the rotating mechanism 6. The inverted U-shaped upright 3 (FIG. 1) further supports a device 8 for discharging impurities from the filtering device 5, including an adjustable stop 33 (FIG. 5) which in the presently described embodiment is in the form of a threaded rod. However, it may be of any other suitable structure. The stop 33 is mounted to overlie the respective ends of the stems 11 and 12, remote from the plates 9 and 10. Furthermore, the device 8 (FIG. 1) includes a mechanism 34 for significantly and instantly enlarging the spacing of the plates 9 and 10 in the course of discharging impurities from the filtering device 5. In the embodiment being described, the functions of the mechanism 34 for enlarging the spacing of the plates 9 and 10 in the course of discharging impurities from the filtering device 5 and of the mechanism 7 for reciprocating the filtering device 5 longitudinally are performed by the same mechanism 7. However, the two mechanisms may be independent ones.

By adjusting the stop 33 (FIG. 5) longitudinally of the filtering device 5, there is controlled the spacing of the plates 9 and 10, required for discharging impurities from the filtering device 5.

The apparatus for refining metal melts from insoluble impurities operates, as follows.

The apparatus has its housing 2 mounted on the pot 1 with molten metal, e.g. unrefined tin. By adjusting axially the adjustable stop 18 on the hollow stem of the filtering device 5, there is preset the required value of the gap $\delta_1$ between the bases of the plates 9 and 10, selected to correspond to the impurity content of the metal to be refined.

The resilient member 17 cooperates with the hollow stem through the abutment 16, urging the abutment 15 mounted on the internal stem 12 into engagement by its surface 20 with the surface 19 of the adjustable abutment 18, whereby the preset value of the gap $\delta_1$ between the bases of the plates 9 and 10 is maintained. The reciprocating mechanism 7 is operated to lower the filtering device 5, with rotation of the drive 28 belonging to the mechanism 7 being transmitted through the driving sprocket 27, chain 26 and sprockets 25 to the lead screws 23. With the lead screws 23 rotating in their bearings 24, the nuts 22 lower with the crosspiece 21 and with the filtering device 5 carried thereby downwardly of the upright 33 belonging to the housing 2, to submerge the plates 9 and 10 in the melt. The molten metal flows into the space 14 between the plates 9 and 10 through the ports 13, filling this space.

The mechanism 6 is operated to rotate the filtering device 5, with rotation being transmitted from the drive 32 through the driving pulley 31, the flexible member 30 and the pulley 29 to the filtering device 5.

The centrifugal forces drive the metal that has filled the space 14 through the ports 13, away from this space through the gap $\delta_1$ between the bases of the plates 9 and 10, back into the refining pot 1, while the impurities are retained in the space 14 in the form of an insoluble crystalline residue. The adjustable stop 33 of the device 8 for discharging impurities from the filtering device 5 is adjusted axially of the device 5 into a position corresponding to the required spacing $\delta_2$ of the plates 9 and 10 in the course of discharging the impurities, selected in accordance with the content of the impurities in the metal being refined.

Meanwhile, the space 14 between the plates 9 and 10 is gradually filled with impurities. With the space filled up, the mechanism 7 is operated to raise the filtering device 5.

The mechanism 34 for significantly and instantly enlarging the spacing of the plates 9 and 10, belonging to the mechanism 8 for discharging impurities from the filtering device 5, performs this significant and instant enlargement to the spacing $\delta_2$ in the following way. As the filtering device 5 is being lifted, the stem 12 abuts against the adjustable stop 33 belonging to the device for discharging impurities from the filtering device 5, mounted on the inverted U-shaped upright 3 of the housing 2, whereby this internal stem 12 is arrested together with the bottom plate 10 carried thereby, while the hollow stem 11 with the top plate 9 are lifted to their uppermost position, with the resilient member 17 being accordingly compressed. The surface 19 of the abutment 18 clears the surface 20 of the abutment 15, and the spacing of the plates 9 and 10 becomes increased to $\delta_2$. Centrifugal forces propel the impurities from the filtering device 5 against the internal wall of the housing 2 of the apparatus. In the housing 2 of the apparatus, the impurities fall by gravity through the openings 4 down from the housing 2, outside the refining pot 1.

With the impurities discharged, the mechanism 7 is operated once again to lower the filtering device 5. First, it is the hollow stem 11 with the plate 9 that are moved downwardly, while the internal stem 12 with the plate 10 carried thereby retain their vertical position by being urged against the adjustable stop 33 by the resilient member 17. The abutment 18 on the hollow stem 11 moves toward the abutment 15 on the internal stem 12 until their surfaces 19 and 20 engage, whereby the gap between the bases of the plates 9 and 10 is set at the same initial value $\delta_1$. Then the plates 9 and 10 of the filtering device 5 are submerged into the melt by the mechanism 7, and the refining cycle is repeated. The refining cycles are repeated with the temperature of the melt being gradually lowered, until the required degree of purification of the metal is attained. With the filtering device 5 having the resilient member 17 accommodated on the internal stem 12 and cooperating with the hollow stem 11 to retain the relative position of the plates 9 and 10, and with the end of the same stem 12, remote from the attachment of the bottom plate 10, carrying the abutment 15 cooperating with the resilient member 17, while the end of the hollow stem 11 carries the adjustable abutment 18 adjoining the first-mentioned abutment 15, the gap between the bases of the plates 9 and 10 can be relatively easily adjusted for operation in the melt, which is essential for optimizing the working duty of the apparatus for refining metals with various impurity content values. Furthermore, the disclosed construction ensures the permanence of the value of the gas $\delta_1$ between the bases of the plates 9 and 10, either in the absence of eventual additional efforts directed axially of the stem 12, or upon elimination of such additional efforts, which facilitates the automation of the operation of the apparatus with the refining cycles being repeated several times.

With the apparatus incorporating the device 8 for discharging impurities from the filtering device 5, comprising the adjustable stop 33 mounted on the upright 3 of the housing 2 directly above the ends of the stems 11 and 12, remote from the plates 9 and 10, and the mechanism 34 for significant and instant enlargement of the spacing of the plates 9 and 10 in the course of discharging the impurities from the filtering device 5, which in the presently described embodiment also performs the functions of the mechanism for reciprocating the device 5, the spacing of the plates 9 and 10 for the operation of discharging the impurities can be likewise relatively easily adjusted. There also provided the possibility of controlling automatically the process of setting the required gap between the bases of the plates 9 and 10 when the filtering device 5 discharges the impurities, and, hence, there is offered the possibility of automation of the operation of the apparatus, as a whole, when the refining cycles are repeated many times in succession.

Furthermore, the employment of the reciprocating mechanism 7 also as the mechanism belonging to the device 8 for discharging impurities from the apparatus enables to simplify the structure of the apparatus and to enhance the reliability of its performance.

Thus, the disclosed structure of the apparatus for refining metal melts from insoluble impurities provides for refining metal within a broad range of impurity content values, and, besides, it enables to introduce automation into the refining process.

What we claim is:

1. An apparatus for refining metal melts from insoluble impurities, comprising: a housing; a filtering device mounted on said housing; a mechanism for driving said filtering device for rotation about the longitudinal axis thereof, mounted on said housing; a mechanism for driving said filtering device through reciprocation along the longitudinal axis thereof, mounted on said housing; a device for discharging impurities from said filtering device, mounted on said housing; said filtering device including: a first stem which is hollow and supported by said housing; a second stem supported by said housing and extending through said first stem; a top plate mounted on the end of said first stem; a bottom plate mounted on the end of said second stem and spaced from said top plate; a resilient member supported by said second stem of said filtering device, adapted to cooperate with said first stem to retain the relative position of said plates; a first abutment carried by the end of said second stem, remote from the end thereof having said bottom plate mounted thereon, for cooperation with said resilient member; an adjustable abutment carried by the end of said first stem to adjoin said first abutment, with the relative position of said adjustable abutment and of said first abutment defining the required spacing of said plates.

2. An apparatus as claimed in claim 1, wherein said device for discharging impurities from said filtering device includes: an adjustable stop mounted on said housing to overlie directly the respective ends of said first and second stems, remote from the ends thereof having said top and bottom plates mounted thereon, said stop being adapted to cooperate operatively with the stem mounted inside said hollow stem.

3. An apparatus as claimed in claim 1, comprising a mechanism for significant and instant enlargement of the spacing of said top and bottom plates in the course of discharging impurities from said filtering device, mounted on said housing.

4. An apparatus as claimed in claim 2, comprising a mechanism for significant and instant enlargement of the spacing of said top and bottom plates in the course of discharging impurities from said filtering device, mounted on said housing.

* * * * *